US012159153B2

United States Patent
Hernandez et al.

(10) Patent No.: US 12,159,153 B2
(45) Date of Patent: Dec. 3, 2024

(54) SYSTEMS AND METHODS FOR MIGRATION OF VIRTUAL COMPUTING RESOURCES USING SMART NETWORK INTERFACE CONTROLLER ACCELERATION

(71) Applicant: Dell Products L.P., Round Rock, TX (US)

(72) Inventors: Hendrich M. Hernandez, Round Rock, TX (US); Gaurav Chawla, Austin, TX (US); William Price Dawkins, Lakeway, TX (US)

(73) Assignee: Dell Products L.P., Round Rock, TX (US)

( * ) Notice: Subject to any disclaimer, the term of this patent is extended or adjusted under 35 U.S.C. 154(b) by 501 days.

(21) Appl. No.: 17/239,859

(22) Filed: Apr. 26, 2021

(65) Prior Publication Data
US 2022/0342688 A1    Oct. 27, 2022

(51) Int. Cl.
*G06F 9/455*    (2018.01)
*G06F 9/48*    (2006.01)
*G06F 9/50*    (2006.01)
*G06F 11/07*    (2006.01)
*G06F 11/14*    (2006.01)
*G06F 12/0882*    (2016.01)

(52) U.S. Cl.
CPC ........ *G06F 9/45558* (2013.01); *G06F 9/4856* (2013.01); *G06F 9/5077* (2013.01); *G06F 11/0757* (2013.01); *G06F 11/1484* (2013.01); *G06F 12/0882* (2013.01); *G06F 2009/45595* (2013.01); *G06F 2201/84* (2013.01)

(58) Field of Classification Search
None
See application file for complete search history.

(56) References Cited

U.S. PATENT DOCUMENTS

| | | |
|---|---|---|
| 8,812,907 B1 | 8/2014 | Bissett et al. |
| 2005/0160423 A1 | 7/2005 | Bantz et al. |
| 2011/0145471 A1 | 6/2011 | Corry et al. |
| 2015/0007172 A1 | 1/2015 | Hudzia et al. |
| 2015/0205542 A1 | 7/2015 | Antony |
| 2015/0331715 A1* | 11/2015 | Sathyanarayana .... G06F 9/5055 718/1 |
| 2015/0381589 A1* | 12/2015 | Tarasuk-Levin .... G06F 12/1408 713/193 |
| 2019/0065231 A1* | 2/2019 | Schmisseur ........... G06F 9/5088 |
| 2021/0124601 A1* | 4/2021 | Das ..................... G06F 9/45558 |
| 2021/0232331 A1 | 7/2021 | Kannan et al. |

(Continued)

OTHER PUBLICATIONS

Han Baoying, "CN112099908—Virtual Machine Thermal Migration Method and Device and Computer Equipment", Tencent Technology (Shenzhen) Co., Ltd. (Year: 2020).*

(Continued)

*Primary Examiner* — Wynuel S Aquino
(74) *Attorney, Agent, or Firm* — Jackson Walker L.L.P.

(57) ABSTRACT

An information handling system may include a first host system, comprising a first processor and a first network interface, and a second host system, comprising a second processor and a second network interface. The first network interface may be configured to accelerate migration of a designated virtual resource from the first host system to the second host system.

9 Claims, 4 Drawing Sheets

(56) References Cited

U.S. PATENT DOCUMENTS

2022/0066806 A1* 3/2022 Ramanathan ......... G06F 9/4856
2022/0121503 A1 4/2022 Bhide et al.

OTHER PUBLICATIONS

Memory Locking, https://www3.physnet.uni-hamburg.de/physnet/Tru64-Unix/HTML/APS33DTE/DOCU_005.HTM.
Enable the Lock Pages in Memory Option (Windows), https://learn.microsoft.com/en-us/sql/database-engine/configure-windows/enable-the-lock-pages-in-memory-option-windows?view=sql-server-ver16.

* cited by examiner

SYSTEMS AND METHODS FOR MIGRATION OF VIRTUAL COMPUTING RESOURCES USING SMART NETWORK INTERFACE CONTROLLER ACCELERATION

TECHNICAL FIELD

The present disclosure relates in general to information handling systems, and more particularly to methods and systems for migration of virtual computing resources accelerated by a smart network interface controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many computing applications, an information handling system includes a hypervisor for hosting one or more virtual machines. A hypervisor may comprise software and/or firmware generally operable to allow multiple virtual machines and/or operating systems to run on a single information handling system at the same time. This operability is generally allowed via virtualization, a technique for hiding the physical characteristics of computing system resources (e.g., physical hardware of the computing system) from the way in which other systems, applications, or end users interact with those resources. Thus, a virtual machine may comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In many instances, it may be desirable or needed to move the execution of a virtual machine from one hardware resource to another hardware resource (e.g., from one processor or processor core to another processor or processor core) or from one hypervisor to another hypervisor, without interruption in service. Such migration may enable underlying hardware to be taken down for maintenance without affecting end users or other applications. Existing approaches to virtual machine migration typically require significant processor time to handle data transfer and interrupt handling for the migration. Thus, systems and methods to perform migration while reducing an amount of processor capacity needed for such migration is desirable.

SUMMARY

In accordance with the teachings of the present disclosure, the disadvantages and problems associated with existing approaches to migration of virtual machines and other computing resources within an information handling system may be reduced or eliminated.

In accordance with embodiments of the present disclosure, an information handling system may include a first host system, comprising a first processor and a first network interface, and a second host system, comprising a second processor and a second network interface. The first network interface may be configured to accelerate migration of a designated virtual resource from the first host system to the second host system by, in response to a command to migrate the designated virtual resource from the first host system to the second host system, causing a first hypervisor executing on the first host system to lock memory pages associated with the designated virtual resource; receiving a memory map of the memory pages from the first hypervisor; communicating a message to the second network interface such that the second network interface causes a second hypervisor executing on the second host system to create a destination virtual resource and allocate memory of the second host system for the destination virtual resource in accordance with the memory map; offloading from the first processor a transfer of memory pages associated with the designated virtual resource from memory of the first host system to memory of the second host system; and upon completion of the transfer of the memory pages, causing the designated virtual resource to pause on the first hypervisor, and causing the destination virtual resource to resume on the second hypervisor.

In accordance with these and other embodiments of the present disclosure, a method may include, in response to a command to migrate a designated virtual resource from a first host system to a second host system of an information handling system, causing, by a first network interface of the first host system, a first hypervisor executing on the first host system to lock memory pages associated with the designated virtual resource; receiving, by the first network interface, a memory map of the memory pages from the first hypervisor; communicating, by the first network interface, a message to a second network interface of the second host system such that the second network interface causes a second hypervisor executing on the second host system to create a destination virtual resource and allocate memory of the second host system for the destination virtual resource in accordance with the memory map; offloading, by the first network interface from a processor of the host system, a transfer of memory pages associated with the designated virtual resource from memory of the first host system to memory of the second host system; and upon completion of the transfer of the memory pages, causing, by the first network interface from the first processor, the designated virtual resource to pause on the first hypervisor, and causing the destination virtual resource to resume on the second hypervisor.

In accordance with these and other embodiments of the present disclosure, an article of manufacture may include a non-transitory computer-readable medium and computer-executable instructions carried on the computer-readable medium, the instructions readable by a processor of a first network interface of a first host system of an information handling system, the instructions, when read and executed, for causing the processor to, in response to a command to migrate a designated virtual resource from the first host system to a second host system of the information handling system, cause a first hypervisor executing on the first host system to lock memory pages associated with the designated virtual resource; receive a memory map of the memory pages from the first hypervisor; communicate a message to a second network interface of the second host system such that the second network interface causes a second hypervisor executing on the second host system to create a destination virtual resource and allocate memory of the second host system for the destination virtual resource in accordance with the memory map; offload from a processor of the first host system, a transfer of memory pages associated with the designated virtual resource from memory of the first host system to memory of the second host system; and upon completion of the transfer of the memory pages, cause the designated virtual resource to pause on the first hypervisor and causing the destination virtual resource to resume on the second hypervisor.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
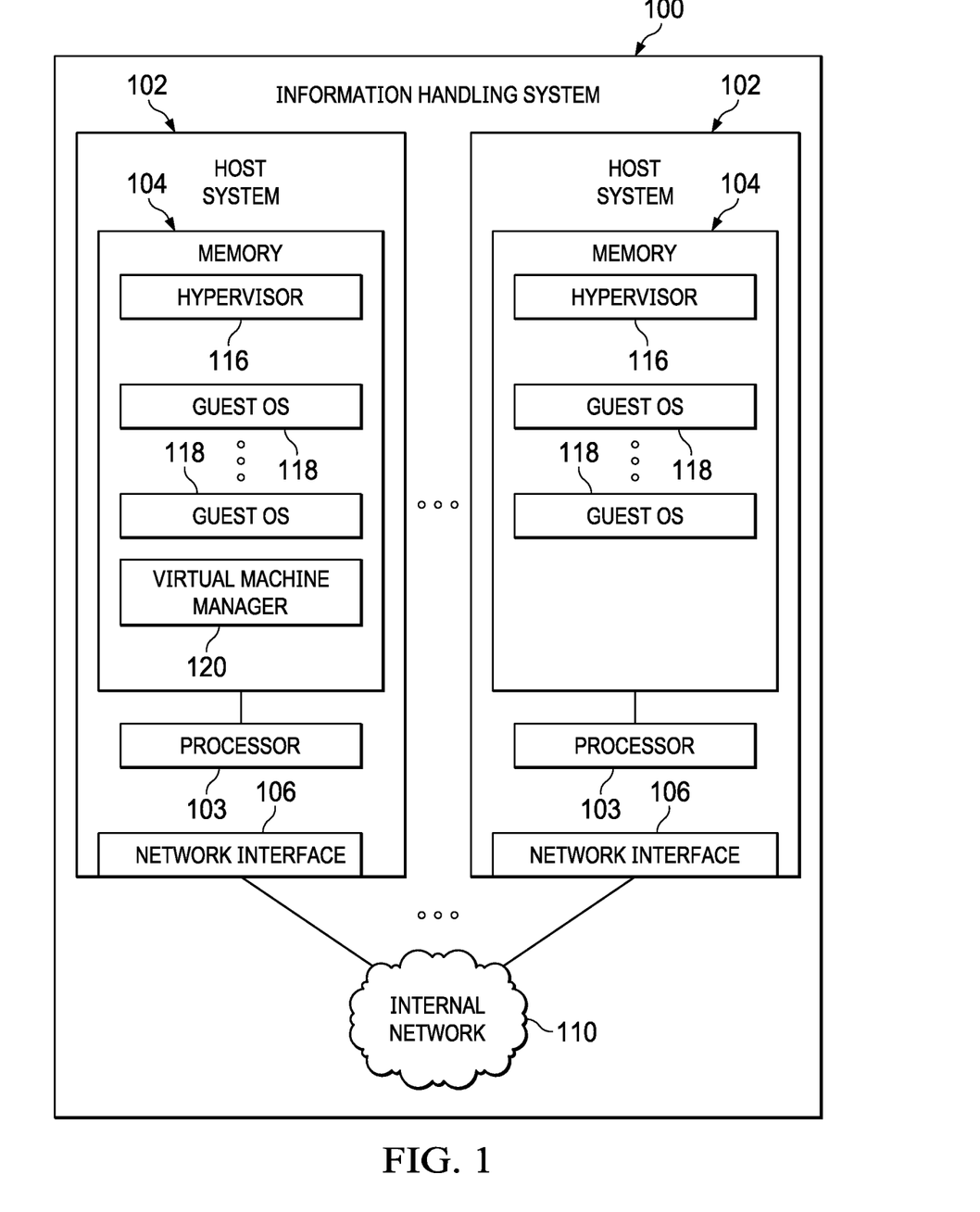
FIG. 1 illustrates a block diagram of selected components of an example information handling system, in accordance with embodiments of the present disclosure.
Figure 2A:
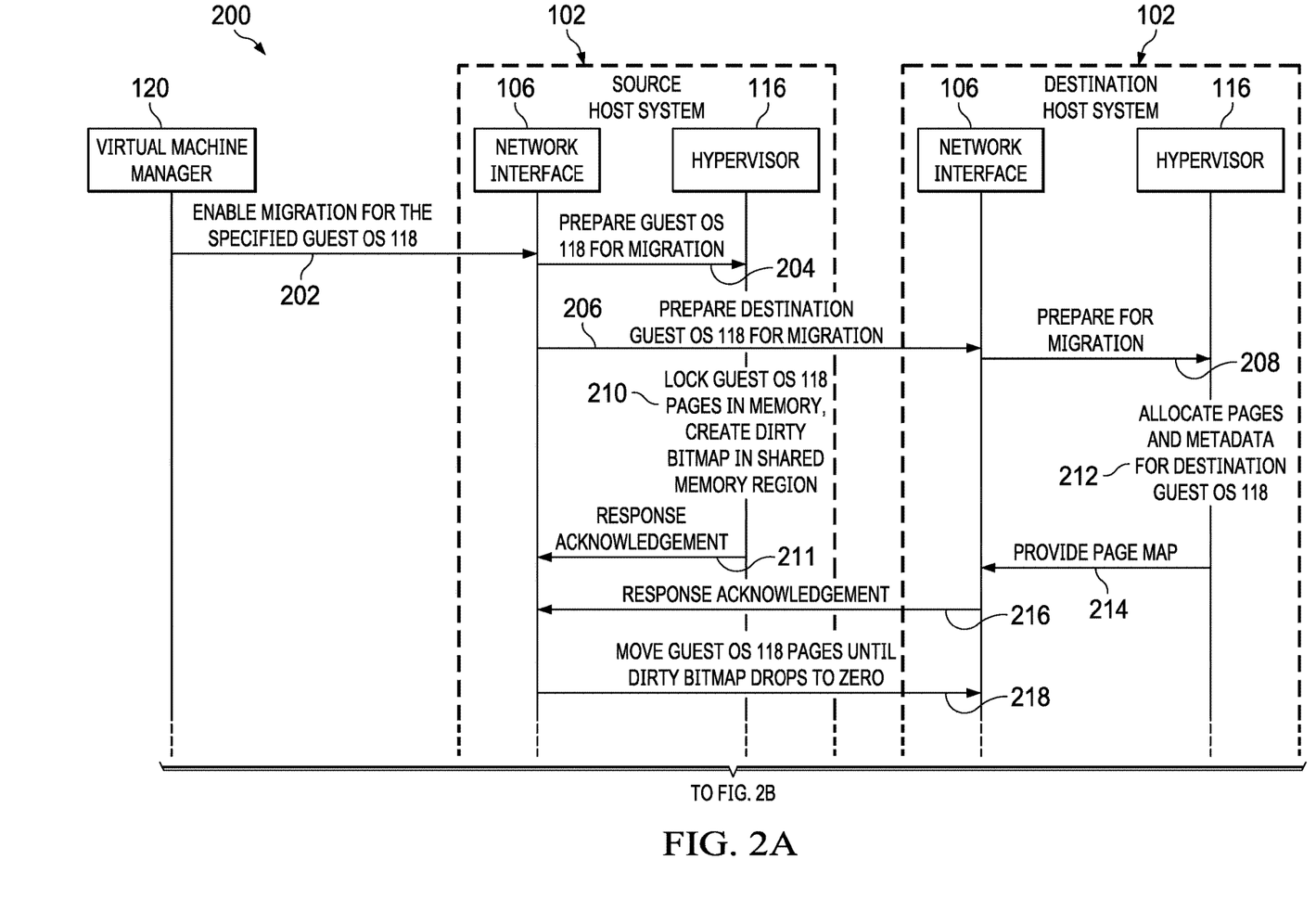
FIGS. 2A and 2B (which may be referred to herein collectively as "FIG. 2") illustrate a flow chart of an example method for migration of computing resources with acceleration by a network interface, in accordance with embodiments of the present disclosure.
Figure 2B:
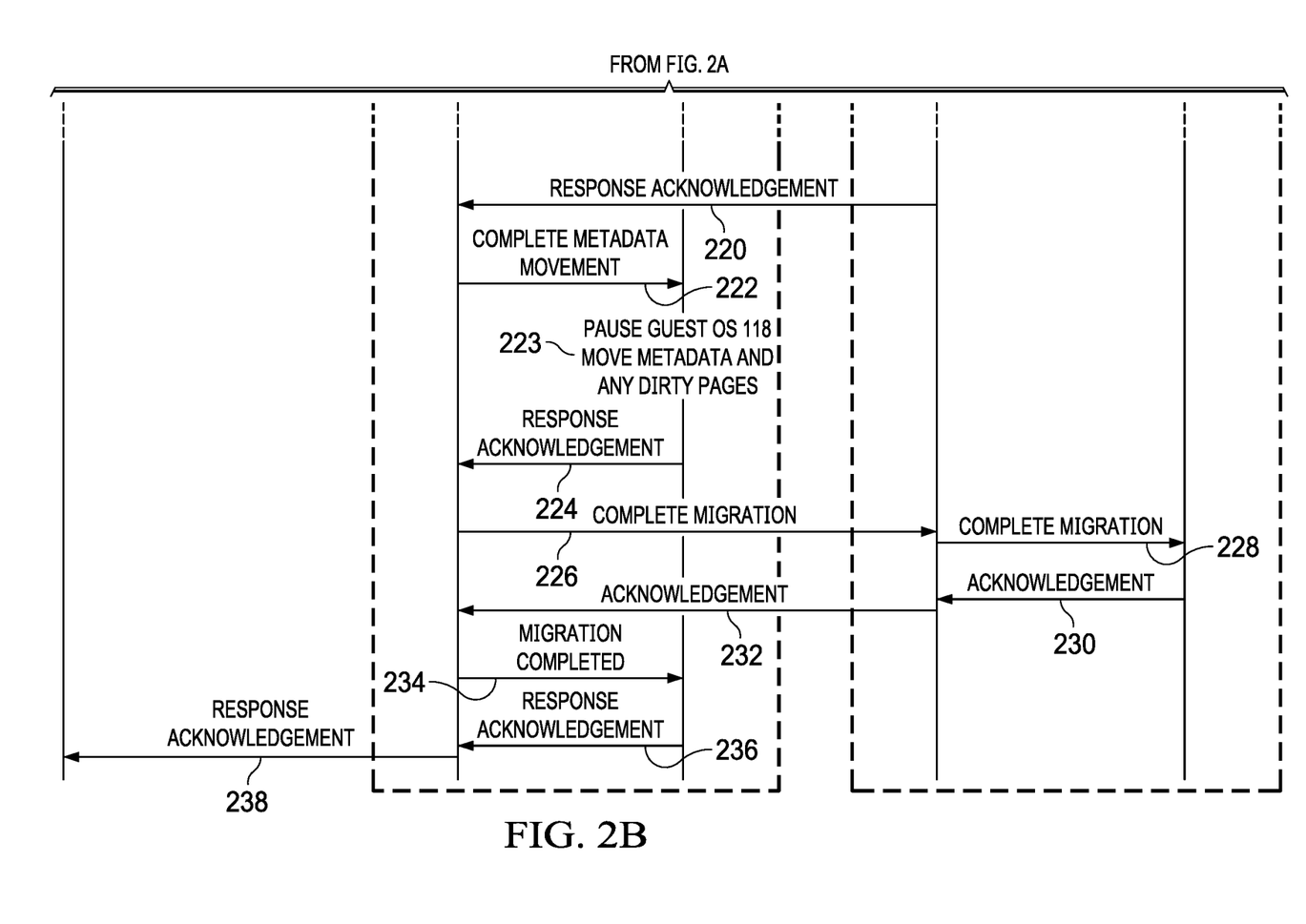
Figure 3:
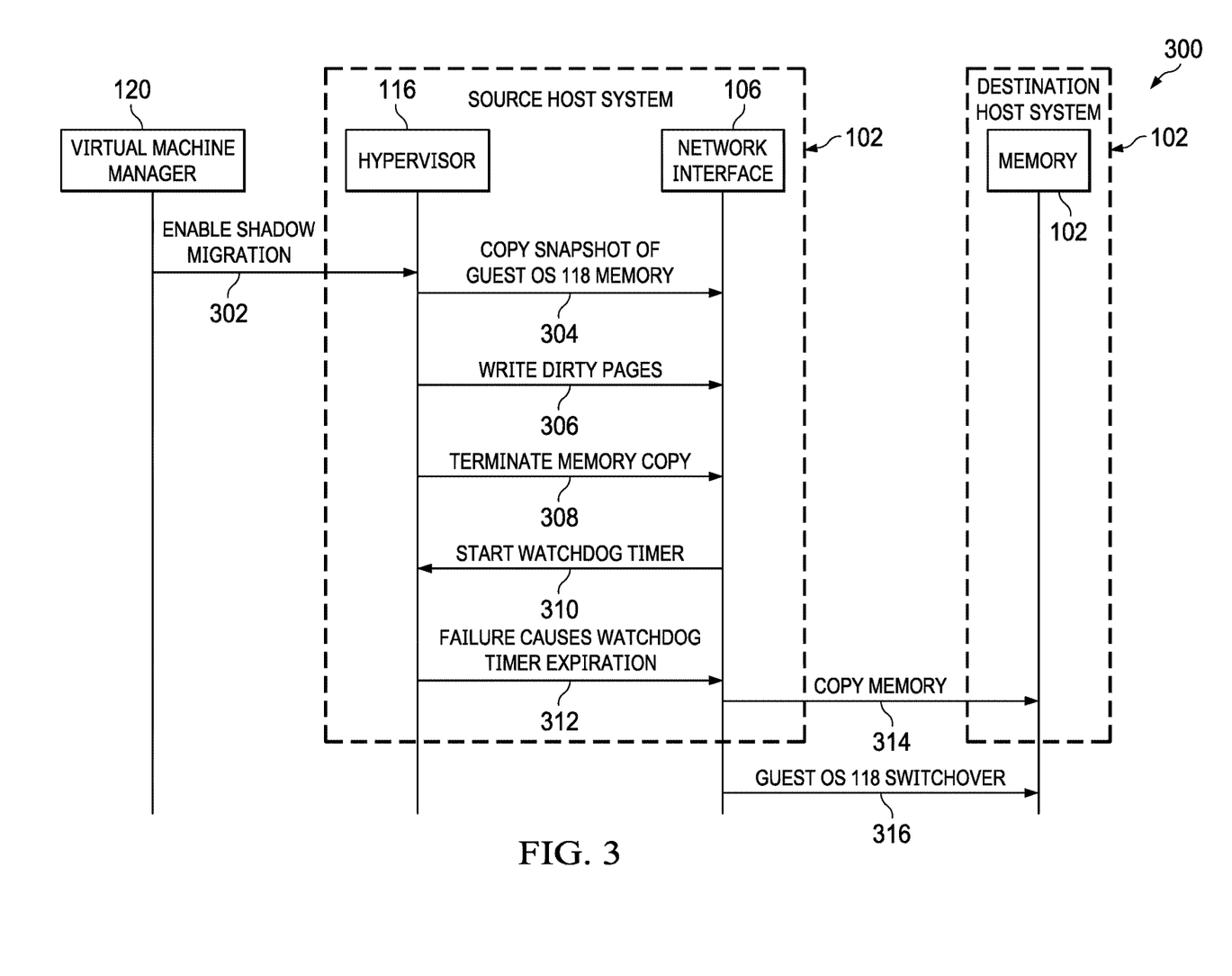
FIG. 3 illustrates a flow chart of an example method for shadow migration of computing resources using a network interface, in accordance with embodiments of the present disclosure.

Preferred embodiments and their advantages are best understood by reference to FIGS. 1 through 3, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of selected components of an example information handling system 100 having a plurality of host systems 102, in accordance with embodiments of the present disclosure. As shown in FIG. 1, information handling system 100 may include a plurality of host systems 102 coupled to one another via an internal network 110.

In some embodiments, a host system 102 may comprise a server (e.g., embodied in a "sled" form factor). In these and other embodiments, a host system 102 may comprise a personal computer. In other embodiments, a host system 102 may be a portable computing device (e.g., a laptop, notebook, tablet, handheld, smart phone, personal digital assistant, etc.). As depicted in FIG. 1, information handling system 102 may include a processor 103, a memory 104 communicatively coupled to processor 103, and a network interface 106 communicatively coupled to processor 103. For the purposes of clarity and exposition, in FIG. 1, each host system 102 is shown as comprising only a single processor 103, single memory 104, and single network interface 106. However, a host system 102 may comprise any suitable number of processors 103, memories 104, and network interfaces 106.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory 104 and/or other computer-readable media accessible to processor 103.

A memory 104 may be communicatively coupled to a processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 100 is turned off.

As shown in FIG. 1, a memory 104 may have stored thereon a hypervisor 116 and one or more guest operating systems (OS) 118. In some embodiments, hypervisor 116 and one or more of guest OSes 118 may be stored in a computer-readable medium (e.g., a local or remote hard disk drive) other than a memory 104 which is accessible to processor 103. Each guest OS 118 may also be referred to as a "virtual machine."

A hypervisor 116 may comprise software and/or firmware generally operable to allow multiple virtual machines and/or operating systems to run on a single computing system (e.g., an information handling system 102) at the same time. This operability is generally allowed via virtualization, a technique for hiding the physical characteristics of computing system resources (e.g., physical hardware of the computing system) from the way in which other systems, applications, or end users interact with those resources. A hypervisor 116 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, a hypervisor 116 may comprise a specially-designed OS with native virtualization capabilities. In another embodiment, a hypervisor 116 may comprise a standard OS with an incorporated virtualization component for performing virtualization.

In another embodiment, a hypervisor 116 may comprise a standard OS running alongside a separate virtualization application. In this embodiment, the virtualization application of the hypervisor 116 may be an application running above the OS and interacting with computing system resources only through the OS. Alternatively, the virtualization application of a hypervisor 116 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 116 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 116 may instantiate one or more virtual machines. A virtual machine may comprise any program of executable instructions, or aggregation of programs of executable instructions, configured to execute a guest OS 118 in order to act through or in connection with a hypervisor 116 to manage and/or control the allocation and usage of hardware resources such as memory, CPU time, disk space, and input and output devices, and provide an interface between such hardware resources and application programs hosted by the guest OS 118. In some embodiments, a guest OS 118 may be a general-purpose OS such as WINDOWS or LINUX, for example. In other embodiments, a guest OS 118 may comprise a specific- and/or limited-purpose OS, configured so as to perform application-specific functionality (e.g., persistent storage).

At least one host system 102 in information handling system 100 may have stored within its memory 104 a virtual machine manager 120. A virtual machine manager 120 may comprise software and/or firmware generally operable to manage individual hypervisors 116 and the guest OSes 118 instantiated on each hypervisor 116, including controlling migration of guest OSes 118 between hypervisors 116. Although FIG. 1 shows virtual machine manager 120 instantiated on a host system 102 on which a hypervisor 116 is also instantiated, in some embodiments virtual machine manager 120 may be instantiated on a dedicated host system 102 within information handling system 100, or a host system 102 of another information handling system 100.

A network interface 106 may include any suitable system, apparatus, or device operable to serve as an interface between an associated information handling system 102 and internal network 110. A network interface 106 may enable its associated information handling system 102 to communicate with internal network 110 using any suitable transmission protocol (e.g., TCP/IP) and/or standard (e.g., IEEE 802.11, Wi-Fi). In certain embodiments, a network interface 106 may include a physical network interface card (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses). In some embodiments, a network interface 106 may be implemented as a local area network ("LAN") on motherboard ("LOM") interface. A network interface 106 may comprise one or more suitable NICs, including without limitation, mezzanine cards, network daughter cards, etc.

In some embodiments, a network interface 106 may comprise a smart network interface card or "smartNIC" which may offer capabilities not found in traditional NICs. In addition to the stateful and custom offloads a smartNIC may provide, it may have an independent management domain with a separate operating system, independent credentials, and independent remote access. Accordingly, network interface 106 may include its own specialized processor and memory.

In addition to processor 103, memory 104, and network interface 106, a host system 102 may include one or more other information handling resources.

Internal network 110 may be a network and/or fabric configured to communicatively couple information handling systems to each other. In certain embodiments, internal network 110 may include a communication infrastructure, which provides physical connections, and a management layer, which organizes the physical connections of host systems 102 and other devices coupled to internal network 110. Internal network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Internal network 110 may transmit data using any storage and/or communication protocol, including without limitation, Fibre Channel, Fibre Channel over Ethernet (FCoE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

In accordance with embodiments of the present disclosure, a network interface 106 may also be configured to accelerate migration of a guest OS 118 from one host system 102 to another host system 102. In operation, in response to a request from virtual machine manager 120 to migrate a guest OS 118 from a source host system 102 to a destination host system 102, network interface 106 of the source host system 102 may interact with hypervisor 116 of the source host system 102 to lock virtual machine pages in memory 104 of the source host system and create a bitmap to track dirty memory pages (e.g., pages of memory 104 associated with the migrated guest OS 118 for which a memory write operation occurs). Further, network interface 106 of the source host system 102 may perform movement of data associated with the migrated guest OS 118 from the source host system 102 to memory 104 of the destination host system 102 and coordinate with hypervisor 116 of the source host system 102 and hypervisor 116 of the destination host system 102 to pause and resume the migrated guest OS 118 in order to complete the migration operation.

FIG. 2 illustrates a flow chart of an example method 200 for migration of computing resources with acceleration by a network interface, in accordance with embodiments of the present disclosure. According to some embodiments, method 200 may begin at step 202 and may be implemented in a variety of configurations of information handling system 100. As such, the preferred initialization point for method 200 and the order of the steps comprising method 200 may depend on the implementation chosen.

At step 202, virtual machine manager 120 may communicate a message to network interface 106 of a source host system 102 to enable communication of a specified guest OS 118. In response, at step 204, network interface 106 of the source host system 102 may communicate a message to hypervisor 116 of the source host system 102 to prepare for migration of the specified guest OS 118. Further, at step 206, network interface 106 of the source host system 102 may communicate a message to network interface 106 of the destination host system 102 to prepare for migration of the specified guest OS 118. At step 208, network interface 106 of the destination host system 102 may communicate a message to hypervisor 116 of the destination host system 102 to prepare for migration.

At step 210, hypervisor 116 of the source host system 102 may lock pages of the specified guest OS 118 in memory 104 and create a dirty bitmap in a shared memory region of information handling system 100. In addition, at step 211, hypervisor 116 of the source host system 102 may communicate a response acknowledgement to network interface 106 of source host system 102.

At step 212, hypervisor 116 of the destination host system 102 may allocate pages and metadata for destination guest OS 118 on destination host system 102. At step 214, hypervisor 116 of the destination host system 102 may communicate a page map to network interface 106 of the destination host system 102.

At step 216, hypervisor 116 of the destination host system 102 may communicate a response acknowledgement to network interface 106 of source host system 102.

At step 218, network interface 106 of the source host system 102 may move pages of guest OS 118 to network interface 106 of the destination host system 102 until the dirty bitmap drops to zero. In response, at step 220, hypervisor 116 of the destination host system 102 may communicate a response acknowledgement to network interface 106 of source host system 102.

At step 222, network interface 106 of the source host system 102 may complete movement of metadata to hypervisor 116 of source host system 102. In response, at step 223, hypervisor 116 of the source host system 102 may pause the specified guest OS 118 and move metadata and any dirty pages in memory 104 to network interface 106 of source host system 102. At step 224, hypervisor 116 of the source host system 102 may communicate a response acknowledgement to network interface 106 of the source host system 102.

At step 226, network interface 106 of the source host system 102 may complete migration of the specified guest OS 118 to network interface 106 of the destination host system 102. In response, at step 228, network interface 106 of the destination host system 102 may complete migration of the specified guest OS 118 to hypervisor 116 of the destination host system 102.

In response to the completion of migration, at step 230, hypervisor 116 of the destination host system 102 may communicate an acknowledgment to network interface 106 of the destination host system 102. In turn, at step 232, network interface 106 of the destination host system 102 may communicate an acknowledgment to network interface 106 of the source host system 102.

At step 234, network interface 106 of the source host system 102 may communicate a message to hypervisor 116 of source host system 102 indicating that the migration of the specific guest OS 118 has completed. In response, at step 236, hypervisor 116 of source host system 102 may communicate a response acknowledgment to network interface 106 of the source host system 102. In turn, at step 238, network interface 106 of the source host system 102 may communicate a response acknowledgment to virtual machine manager 120.

At completion of step 238, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 100 or any other system operable to implement method 200. In certain embodiments, method 200 may be implemented partially or fully in software and/or firmware embodied in computer-readable media.

In addition to or in lieu of the functionality described above, a network interface 106 on a host system 102 may be configured to continuously copy memory associated with a guest OS 118 to its local memory as a background service.

Such data movement may be over a Peripheral Component Interconnect Express interface, rather than via internal network 110. Further, such network interface 106 may also maintain a watchdog timer, such that in case of a failure of the host system 102, network interface 106 may trigger a live migration of the guest OS 118 from its local memory to a destination host system 102 or a network interface of the destination host system 102.

FIG. 3 illustrates a flow chart of an example method 300 for shadow migration of computing resources using a network interface, in accordance with embodiments of the present disclosure. According to some embodiments, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

At step 302, virtual machine manager 120 may communicate a message to hypervisor 116 of a source host system 102 to enable shadow migration of one or more specified guest OSes 118. At step 304, network interface 106 of the source host system 102 may copy a snapshot of memory associated with guest OS 118 from hypervisor 116 of the source host system 102 and store such snapshot in local memory of network interface 106. At step 306, hypervisor 116 of the source host system 102 may write dirty pages associated with guest OS 118 to the local memory of network interface 106 of the source host system 102. At step 308, hypervisor 116 and network interface 106 of the source host system 102 may cease copying of memory associated with guest OS 118.

At step 310, network interface 106 of the source host system 102 may start a watchdog timer, which may occasionally reset in response to activity occurring with respect to the guest OS 118/hypervisor 116. Accordingly, at step 312, any hardware failure or OS failure associated with source host system 102 may cause the watchdog timer to expire.

In response to expiration of the watchdog timer, at step 314, network interface 106 of the source host system 102 may copy memory associated with the guest OS 118 to memory 104 of a destination host system 102. After the memory associated with the guest OS 118 has been completely transferred, at step 316, network interface 106 of the source host system 102 may cause hypervisor 116 of the destination host system 102 to switch over execution of guest OS 118 to hypervisor 116 of the destination host system 102.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 100 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a first host system, comprising a first processor and a first network interface; and
a second host system, comprising a second processor and a second network interface;
wherein the first network interface is configured to accelerate migration of a designated virtual resource from the first host system to the second host system by, in response to a command to migrate the designated virtual resource from the first host system to the second host system:
  causing a first hypervisor executing on the first host system to lock memory pages associated with the designated virtual resource to prevent the memory pages from being paged to a virtual memory;
  receiving a memory map of the memory pages from the first hypervisor;
  communicating a message to the second network interface such that the second network interface causes a second hypervisor executing on the second host system to create a destination virtual resource and allocate memory of the second host system for the destination virtual resource in accordance with the memory map;
  offloading from the first processor a transfer of memory pages associated with the designated virtual resource from memory of the first host system to memory of the second host system; and
  upon completion of the transfer of the memory pages, causing the designated virtual resource to pause on the first hypervisor and causing the destination virtual resource to resume on the second hypervisor; and
wherein the first network interface is further configured to, in response to a command to perform shadow migration:
  copy a snapshot of memory pages associated with a shadowed virtual resource from the memory of the first host system to a memory of the first network interface;
  after completion of copying the snapshot, initiate a timer configured to expire as a result of a failure associated with the first host system; and
  in response to expiration of the timer:
    copy the snapshot to memory associated with another host system besides the first host system; and
    switch over the shadowed virtual resource from the first host system to another hypervisor executing on the other host system.

2. The information handling system of claim 1, wherein:
the first hypervisor is configured to update a dirty bitmap of memory pages associated with the designated virtual resource during the transfer of memory pages; and
the first network interface transfers memory pages associated with the designated virtual resource from memory of the first host system to memory of the second host system until no entries remain in the dirty bitmap.

3. The information handling system of claim 1, wherein the designated virtual resource comprises a virtual machine embodied in a guest operating system of the first hypervisor.

4. A method comprising:
in response to a command to migrate a designated virtual resource from a first host system to a second host system of an information handling system:
  causing, by a first network interface of the first host system, a first hypervisor executing on the first host system to lock memory pages associated with the designated virtual resource to prevent the memory pages from being paged to a virtual memory;
  receiving, by the first network interface, a memory map of the memory pages from the first hypervisor;
  communicating, by the first network interface, a message to a second network interface of the second host system such that the second network interface causes a second hypervisor executing on the second host system to create a destination virtual resource and allocate memory of the second host system for the destination virtual resource in accordance with the memory map;
  offloading, by the first network interface from a processor of the host system, a transfer of memory pages associated with the designated virtual resource from memory of the first host system to memory of the second host system; and
  upon completion of the transfer of the memory pages, causing, by the first network interface from the first processor, the designated virtual resource to pause on the first hypervisor and causing the destination virtual resource to resume on the second hypervisor; and
in response to receipt of a command to perform shadow migration:
  copying, by the first network interface, a snapshot of memory pages associated with a shadowed virtual resource from the memory of the first host system to a memory of the first network interface;
  after completion of copying the snapshot, initiating, by the first network interface, a timer configured to expire as a result of a failure associated with the first host system; and
  in response to expiration of the timer:
    copying, by the first network interface, the snapshot to memory associated with another host system besides the first host system; and
    switching over, by the first network interface, the shadowed virtual resource from the first host system to another hypervisor executing on the other host system.

5. The method of claim 4, wherein:
the first hypervisor is configured to update a dirty bitmap of memory pages associated with the designated virtual resource during the transfer of memory pages; and
the method further comprises transferring, by the first network interface, memory pages associated with the designated virtual resource from memory of the first host system to memory of the second host system until no entries remain in the dirty bitmap.

6. The method of claim 4, wherein the designated virtual resource comprises a virtual machine embodied in a guest operating system of the first hypervisor.

7. An article of manufacture comprising:
a non-transitory computer-readable medium; and
computer-executable instructions carried on the computer-readable medium, the instructions readable by a processor of a first network interface of a first host system of an information handling system, the instructions, when read and executed, for causing the processor to, in response to a command to migrate a designated virtual resource from the first host system to a second host system of the information handling system:
  cause a first hypervisor executing on the first host system to lock memory pages associated with the designated virtual resource to prevent the memory pages from being paged to a virtual memory;
  receive a memory map of the memory pages from the first hypervisor;
  communicate a message to a second network interface of the second host system such that the second network interface causes a second hypervisor executing on the second host system to create a destination virtual resource and allocate memory of the second host system for the destination virtual resource in accordance with the memory map;

offload from a processor of the first host system, a transfer of memory pages associated with the designated virtual resource from memory of the first host system to memory of the second host system; and upon completion of the transfer of the memory pages, cause the designated virtual resource to pause on the first hypervisor and causing the destination virtual resource to resume on the second hypervisor; and the instructions for further causing the processor to, in response to receipt of a command to perform shadow migration:

copy a snapshot of memory pages associated with a shadowed virtual resource from the memory of the first host system to a memory of the first network interface;

initiate a timer configured to expire as a result of a failure associated with the first host system; and in response to expiration of the timer:

copy the snapshot to memory associated with another host system besides the first host system; and switch over the shadowed virtual resource from the first host system to another hypervisor executing on the other host system.

8. The article of claim 7, wherein:

the first hypervisor is configured to update a dirty bitmap of memory pages associated with the designated virtual resource during the transfer of memory pages; and the instructions are further for causing the processor to transfer memory pages associated with the designated virtual resource from memory of the first host system to memory of the second host system until no entries remain in the dirty bitmap.

9. The article of claim 7, wherein the designated virtual resource comprises a virtual machine embodied in a guest operating system of the first hypervisor.

* * * * *